UNITED STATES PATENT OFFICE.

LOTHAR STERNBERG, OF JERSEY CITY, NEW JERSEY, ASSIGNOR TO THE AMERICAN SUGAR REFINING COMPANY, OF SAME PLACE.

PROCESS OF OBTAINING AMMONIA OR OTHER SALTS FROM MOLASSES.

SPECIFICATION forming part of Letters Patent No. 486,647, dated November 22, 1892.

Application filed January 5, 1892. Serial No. 417,111. (No specimens.)

*To all whom it may concern:*

Be it known that I, LOTHAR STERNBERG, of Jersey City, New Jersey, have invented a certain Process of Obtaining the Ammonia and other Salts Present in Molasses, of which the following is a specification.

Beet-sugar molasses and cane-sugar molasses, in addition to containing various salts, such as carbonate of potassium, carbonate of sodium, chloride of potassium, sulphate of potassium, &c., also contain 1.5 per cent. (more or less) of nitrogen, equal to 1.8 per cent. of ammonia, or about seven per cent. of sulphate of ammonia. All these compounds go into the waste lye whenever molasses is treated by the lime, strontian, baryta, or other known processes for the extraction of its sugar or when it is fermented and distilled for the production of alcohol.

Heretofore by evaporating the lyes to about 35° Baumé and calcining them in a suitable furnace the salts of potassium and sodium have been recovered, but the nitrogen has been lost. Attempts have been made to save the nitrogen in the form of ammonia or ammonia salts, but without practical success. By the present invention it is made practicable to obtain the compounds of nitrogen in the form of ammonia or any salt of ammonia, as well as the salts of potassium and sodium.

The principal features of the invention are the transformation of the waste lye into a solid porous body, the calcination of this body at a red heat while excluded from air and maintained in an atmosphere of superheated steam, and the absorption of the resulting ammonia-gas by any mineral acid, sulphuric acid being preferably employed, because the resulting ammonia sulphate has an especially high commercial value.

If the waste lye results from any process of extracting sugar, any excess of lime, strontia, or baryta present in it should be removed by the usual treatment with carbonic acid, or otherwise, preparatory to treating the lye by the present process.

The transformation of the waste lye into solid form is effected by first evaporating it to a density of about 45° Baumé and then mixing it with a carrier composed of a granular or powdered substance or substances of absorbent character capable of forming with the concentrated lye a mixture which when dried will acquire a hard and porous condition. Various substances may be used for such carrier—as, for example, crushed coke fine enough to pass through a sieve of No. 30 mesh, bone-black, refuse bone-black, bone-black siftings, or powdered quicklime, carbonate of lime, sulphate of lime, calcined magnesia, or iron ores, especially those consisting of iron hydroxide. If such powdered substances are employed, it is desirable to mix therewith a small proportion of sawdust, turf-litter, spent tanbark, logwood, or some similar substance which will increase the absorbing capacity of the carrier, facilitate desiccation, and add to the porosity of the resulting dried mixture. The mixture is formed, preferably, of, say, three parts of the carrier to two parts of the concentrated lye, and is dried at a temperature of upward of 130° Fahrenheit, then crushed into fragments of suitable size, and for a period of two hours (more or less) subjected to a red heat in a cast-iron retort into the top of which superheated steam is introduced and which is provided at the bottom with an aperture which affords the outlet for the escape of the steam, vapors, and gas from the retort.

By the concurrent action of the heat and steam the organic matters of the waste lye are burned. The inorganic matters, especially potassium and sodium, remain as carbonates, chlorides, and sulphates, while the nitrogenous compounds are transformed into ammonia-gas. Such formation of ammonia is principally due to the exclusion of air from the retort and the solid but porous character of the material therein, composed of the concentrated waste lye and its carrier, owing to which the steam acquires contact with the smallest particles of lye.

The retorts and furnaces employed may be similar in construction to the retorts and furnaces for revivifying bone-black.

The vapors discharged from the bottom of the retort, containing besides the ammonia-gas an excess of steam, tar products, and water-gas, (composed of hydrogen and carbonic oxide resulting from the burning of the organic matters and partly from the burning of the coke, if coke be employed,) are conducted from the retort to the bottom of an ordinary condensing chamber or tower filled in the usual manner with loosely-piled bricks or with perforated bricks.

Into the upper end of the tower there is introduced a solution of ammonia sulphate containing from thirty-five to thirty-eight per cent. of ammonia sulphate and, say, 2.5 per cent. of free sulphuric acid. This solution trickles down through the perforations in or the interstices between the bricks and covers the exposed surfaces of the bricks, and is thus favorably presented for contact with the ammonia-gas introduced into the tower from the retort. Under these conditions the tar will be condensed and the ammonia will combine with the free sulphuric acid and thus form an additional quantity of sulphate of ammonia.

The ammonia-sulphate solution, together with the other liquids discharged from the condensing-tower, are conducted into a settling-tank. The tar products will be from time to time drawn off from the upper part of the settling-tank and the ammonia-sulphate solution will be drawn off from the lower part of the settling-tank. If the ammonia-sulphate solution thus drawn off is found to contain less than thirty-eight per cent. of ammonia sulphate, it is pumped back to the top of the condensing-tower, previous to which, however, there is added to it such a quantity of sulphuric acid that when the solution next flows from the bottom of the tower after absorbing a further quantity of ammonia therein it will contain not more than 2.5 per cent. of free sulphuric acid. If there should be more than 2.5 per cent. of free sulphuric acid in the solution, the tar would not readily separate from it in the settling-tank.

The vapors discharged from the tower, which under the described conditions are practically free from ammonia, are conducted to an evaporating pan or coil, in which the steam is condensed and its heat utilized for any desired heating purposes. The remaining water-gas is withdrawn and forced into a gasometer and may be used for heating the retort or for any other purpose.

When the ammonia-sulphate solution drawn from the settling-tank is found to contain thirty-eight per cent. of ammonia sulphate, a portion of it is conducted to a leaden pan, in which it is evaporated to the crystallizing-point, with the result that crystallized ammonia sulphate is formed. To utilize the free sulphuric acid remaining in the mother-lye after crystallization has ceased, the mother-lye is removed from the crystallizing-pan and diluted with water and has added to it a quantity of sulphuric acid equal to that taken up by the crystallized ammonia sulphate, after which it is pumped up to the top of the condensing-tower, and the sulphuric acid present in it is thus employed, as before described, to absorb new quantities of ammonia. The calcined mass from the retort is immersed in water, whereby a portion of it is dissolved. The coke remaining unburned is again used, or the whole mass may be used to absorb a new quantity of waste lye preparatory to the drying and treatment of the resultant mixture, as before described. The solution resulting from the dissolving of a portion of the calcined mass from the retort is evaporated in the usual manner in order to obtain by crystallization the salts which it contains, to wit: first, the sulphate of potassium, then the chloride of potassium, then the carbonate of sodium, and at last, after calcination, the carbonate of potassium.

It will of course be understood that the method of fixing ammonia by causing it to come in contact with sulphuric acid in a condensing-tower is not of itself new, but is referred to as a sequence to the herein-described operation of extracting all the ammonia from the waste lye resulting from the manufacture of refined sugar or alcohol from molasses.

What is claimed as the invention is—

1. The method of treating the waste lyes resulting from the extraction of sugar or the production of alcohol from molasses preparatory to extracting ammonia therefrom, which consists in concentrating such lyes after they have, if necessary, been freed from any excess of lime, strontia, and baryta, to a density of, say, 45° Baumé, then forming a mixture of the concentrated lye with any suitable carrier, such as granulated coke, then drying such mixture and crushing the resultant dried mixture suitably for introduction into a calcining-retort.

2. The method of extracting ammonia from the waste lyes resulting from the extraction of sugar or the production of alcohol from molasses, which consists in concentrating such waste lyes after they have, if necessary, been freed from any excess of lime, strontia, and baryta to a density of, say, 45° Baumé, then forming a mixture of the concentrated lye with any suitable carrier, such as granulated coke, then drying such mixture and crushing the resultant dried mixture and calcining it in a retort in an atmosphere of superheated steam, and in conducting the ammonia-gas from such retort to the ordinary condensing-tower, wherein the ammonia-gas is brought into contact with sulphuric acid and by combination therewith formed into ammonia sulphate.

3. The method of extracting the valuable constituents from the waste lyes produced in the extraction of sugar or the manufacture of alcohol from molasses, which consists in forming a mixture of such concentrated waste lye with a suitable carrier, such as granulated coke, drying said mixture, then crushing it and calcining it in a retort charged with superheated steam, conducting the vapors and gases from said retort to a condensing-tower loosely filled with bricks kept wet with an ammonia-sulphate solution containing free sulphuric acid, conducting from said tower the excess of steam and the water-gas occluded therein to a condensing-coil for the condensation of the steam and the utilization of the heat thereof, conducting the water-gas from said coil to a gasometer, draining the liquids discharged from the condensing-tower into a settling-tank, separately drawing off the resultant ammonia solution from said settling-tank, and, finally, dissolving in water any desired part of the calcined mass from the retort and obtaining the potassium and other salts from the resultant solution by the usual methods.

LOTHAR STERNBERG.

Witnesses:
ABRAM JACOBSON,
E. GATTERER.